(12) United States Patent
Jacobson et al.

(10) Patent No.: US 6,757,807 B1
(45) Date of Patent: Jun. 29, 2004

(54) EXPLICITLY CLUSTERED REGISTER FILE AND EXECUTION UNIT ARCHITECTURE

(75) Inventors: Quinn A. Jacobson, Sunnyvale, CA (US); Chiao-Mei Chuang, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 650 days.

(21) Appl. No.: 09/642,075

(22) Filed: Aug. 18, 2000

(51) Int. Cl.[7] .............................................. G06F 15/00
(52) U.S. Cl. ............................ 712/23; 712/28; 712/34
(58) Field of Search ............................ 712/32, 34, 36, 712/23, 24, 25, 26, 28, 30, 200, 201, 203, 206, 211, 215, 218, 222, 225

(56) References Cited

U.S. PATENT DOCUMENTS

| | | | | |
|---|---|---|---|---|
| 5,493,687 A | * | 2/1996 | Garg et al. ................... 712/23 |
| 5,509,130 A | * | 4/1996 | Trauben et al. .............. 712/215 |
| 5,684,983 A | | 11/1997 | Ando .......................... 395/566 |
| 5,758,176 A | * | 5/1998 | Agarwal et al. ............... 712/23 |
| 5,852,726 A | | 12/1998 | Lin et al. ..................... 395/376 |
| 5,884,060 A | * | 3/1999 | Vegesna et al. ............. 712/215 |
| 5,887,183 A | * | 3/1999 | Agarwal et al. ................ 712/2 |
| 5,987,587 A | * | 11/1999 | Meltzer ........................ 712/23 |
| 6,044,449 A | * | 3/2000 | Garg et al. .................... 712/23 |
| 6,061,781 A | * | 5/2000 | Jain et al. ................... 712/221 |
| 6,249,856 B1 | * | 6/2001 | Garg et al. .................... 712/23 |
| 6,546,478 B1 | * | 4/2003 | Keller et al. ................. 712/204 |

* cited by examiner

Primary Examiner—Henry W. H. Tsai
(74) Attorney, Agent, or Firm—Martine & Penilla, LLP (57) ABSTRACT

A processor comprising a new architectural feature called a Register Domain, where a Register Domain has a register file, at least one execution unit, and coupling circuitry between the two. A processor will typically have a plurality of Register Domains, and Register Domains may have different types of execution units within them. Individual Register Domains will be visible to a user.

29 Claims, 9 Drawing Sheets

Execution Unit Parallelism According To The Present Invention Showing Register Transfer Unit And Domain Determiner/Sender FIG. 1
Prior Art Processor FIG. 2
Prior Art Execution Unit Parallelism FIG. 3
Further Prior Art
Execution Unit Parallelism FIG. 4
Execution Unit Parallelism According To The Present Invention FIG. 5
Execution Unit Parallelism According To The Present Invention Showing Register Transfer Unit And Domain Determiner/Sender FIG. 6
Execution Unit Parallelism According To The Present Invention Showing PC Registers FIG. 8
Use Of Dynamic Subprocessors FIG. 9A Data Organization: Singly Linked List FIG. 9B Data Organization: Byte Stream

EXPLICITLY CLUSTERED REGISTER FILE AND EXECUTION UNIT ARCHITECTURE

BACKGROUND OF THE INVENTION

1. Field of the Invention

This invention pertains generally to processor architecture, focussing on the execution units. More particularly this invention is directed to an improved processor using clustered groups of execution units visible at the macro-architecture level, facilitating improved parallelism and backwards compatibility in a processor instruction set.

2. The Prior Art

As reliance on computer systems has increased so have demands on system performance. This has been particularly noticeable in the past decade as both businesses and individual users have demanded far more than the simple character cell output on dumb terminals driven by simple, non-graphical applications typically used in the past. Coupled with more sophisticated applications and internet use, the demands on the system and in particular the main processor are increasing at a very high rate.

As is well known in the art a processor is used in a computer system, where the computer system as a whole is of conventional design using well known components. An example of a typical computer system is the Sun Microsystems Ultra 10 Model 333 Workstation running the Solaris v.7 operating system. Technical details of the example system may be found on Sun Microsystems' website.

Figure 1:
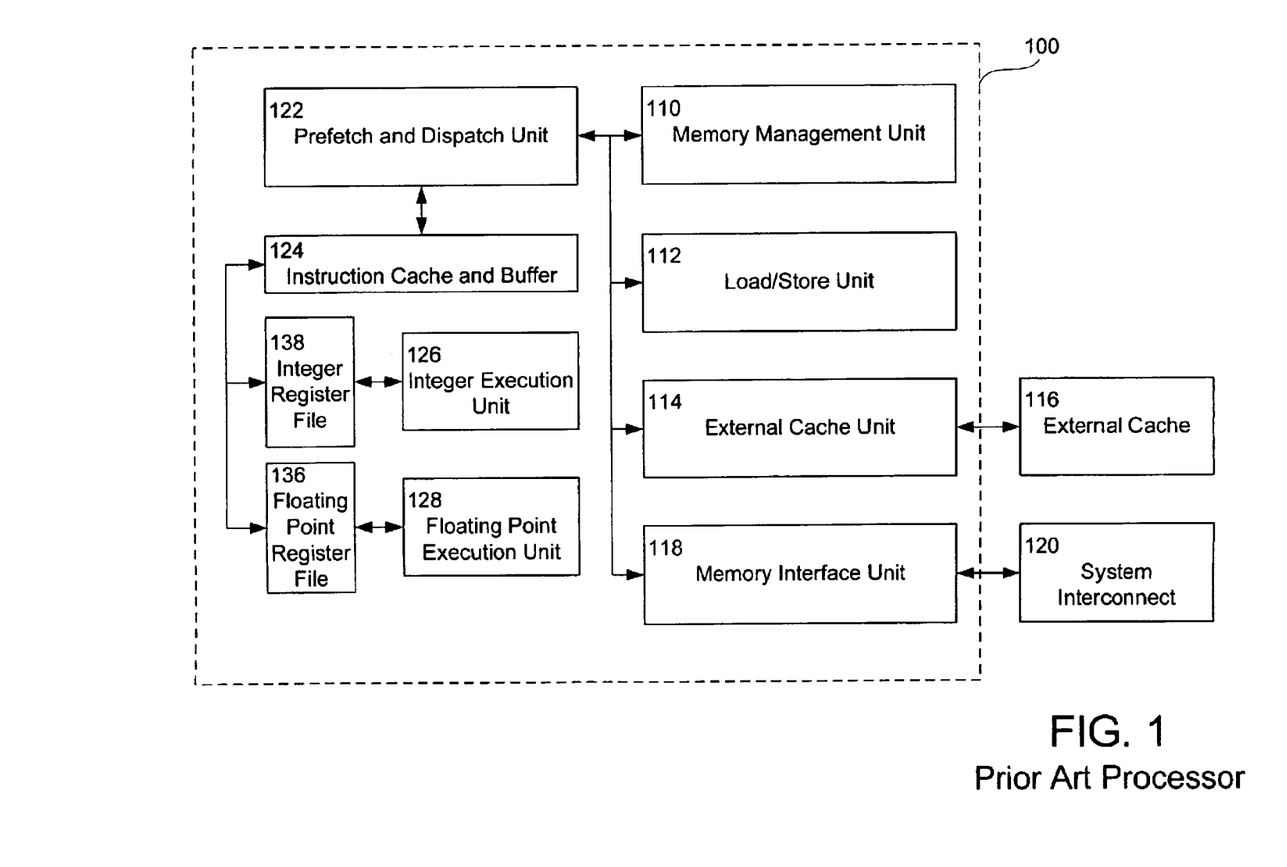
FIG. 1 is a block diagram of a prior art processor.

A typical processor is shown in block diagram form in FIG. 1. Processor 100 contains a Prefetch And Dispatch Unit 122 which fetches and decodes instructions from main memory (not shown) through Memory Management Unit 110, Memory Interface Unit 118, and System Interconnect 120. In some cases, the instructions or their operands may be in non-local cache in which case Prefetch And Dispatch Unit 122 uses External Cache Unit 114 to access external cache RAM 116. Instructions that are decoded and waiting for execution may be stored in Instruction Cache And Buffer 124. Prefetch And Dispatch Unit 122 detects which type of instruction it has, and sends integer instructions to Integer Execution Unit 126 and floating point instructions to Floating Point Execution Unit 128. The instructions sent by Prefetch And Dispatch Unit 122 to Integer Execution Unit 126 contain register addresses, typically two read locations and one write location, where the read locations are the values to be operated on and the write location is where the result will be stored.

Figure 2:
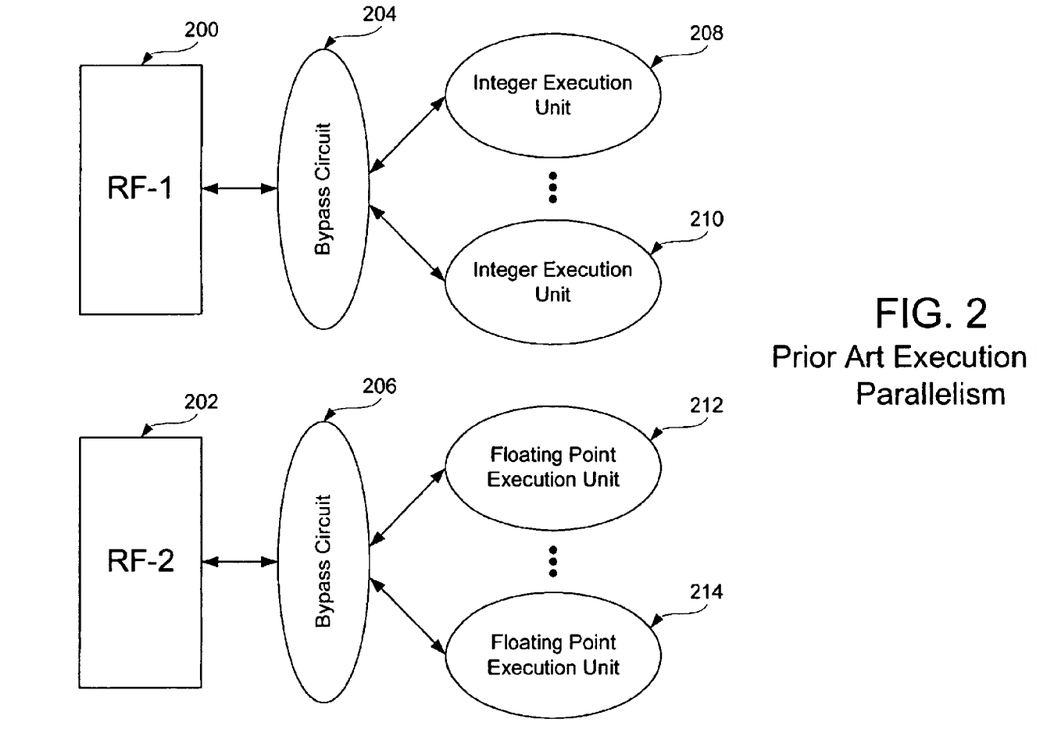
FIG. 2 is a block diagram showing parallelism implemented in a prior art processor.

FIG. 1 has one integer and one floating point execution unit. To improve performance parallel execution units were added. One parallel execution unit implementation is shown in FIG. 2. To avoid the confusion and surplus verbiage caused by the inclusion of non-relevant portions of the processor, FIG. 2 and subsequent drawings show only the relevant portions of a processor. As will be appreciated by one of ordinary skill in the art, the portion of a processor shown is functionally integrated into the rest of a processor.

Integer Register File 200 is used by Integer Execution Units 208 and 210, as well as any other integer execution units that could be connected. Floating Point Register File 202 is used by Floating Point Execution Units 212 and 214, as well as any other floating point execution units that could be connected. Also shown are Bypass Circuits 204 and 206. Bypass circuits are needed because one execution unit can attempt both a read and a write to a particular register, or one execution unit may be reading a register in its corresponding register file while another is trying to write to the same register. Depending on the exact timing of the signals as they arrive over the data lines from one or both execution units, this can lead to indeterminate results. Bypass Circuits 204 and 206 detect this condition and arbitrate access. The correct value is sent to the execution unit executing a read, and the correct new value into is written into the register. The circuitry needed to do this is complex for more than one execution unit.

Additional execution units need additional register ports to read and write the register files. The complexity of the bypass circuitry rises as the square of the number of register ports attached; for n register ports on a register file the complexity of the bypass circuitry rises as $n^2$. Thus, having too many execution units attached to a register file will slow performance due to the additional complexity of the register file's support circuitry.

Referring now to complexity in general, complexity is an abstract metric of the cost of implementing a given mechanism or feature. Complexity translates most directly into the size of the needed circuits. Higher complexity also correlates with higher latency in the circuitry for most circuits, and higher latency means decreased performance. This means it is generally critical to keep complexity to a minimum; otherwise performance begins to decrease which almost always defeats the purpose of the added circuitry.

In addition to the complexity associated with the number of attached execution units and bypass circuitry, a primary bottleneck on the size of register files is the number of ports that must be made available to read and write the registers. The complexity associated with the number of ports is proportional to the square of the total number of ports on a register file. Since there are typically two read operations for every write operation (i.e., most instructions read two values from a register file and write a resulting value), register files typically have two read ports for every write port. If a register file has 8 read ports and 4 write ports, its relative order of complexity would be on the order of $(8+4)^2=144$ with 12 ports, when compared to other register files with other numbers of ports. Using the same register file but trying to increase its throughput by increasing the number of read ports by 4 and the number of write ports by 2 yields a relative order of complexity of $(12+6)2 =324$ with 18 ports. As an alternative, adding a duplicate of the original register file yields a relative order of complexity of $(8+4)^2+(8+4)^2= 244$ with 24 ports. Thus, using more register files with fewer ports per register file adds less complexity with more ports (for more throughput) than trying to increase the number of ports on a single register file.

The desirable goal of making more registers visible to the programmer and/or compiler is also difficult. In addition to other complexity considerations, the complexity of any register file grows linearly as the number of visible registers grows. To address additional visible registers, more bits in each instruction are needed. This is often not possible given the limited encoding space (field size) of existing instruction set architectures, or is prohibitively expensive in terms of complexity and cost for new instruction sets.

A new architecture was introduced to address some of the complexity issues associated with the need for increased throughput of the register files. It is based on the principle that many ports can be physically implemented with multiple smaller register files. Each smaller register has the same number of total write ports the single register file implementation would have, but a smaller number of read ports.

When an implementation uses more than one physical register file, all the register files that takes the place of the single register files are copies of one another. Since the register files are all copies of one another, a write of any one location in one register file is actually performed as a parallel write to all the small register files. Thus, the number of write ports would stay roughly the same when compared to a large register file. However, the number of read ports may be reduced as only local execution units would read from a given register file rather than all the execution units. This reduces the amount of reads going through any given register file, requiring fewer read ports per register file, and therefore the total number of read ports, when compared to a single large register file. This is an additional complexity savings over that already discussed. Continuing with the example started in the paragraph before last, a single 8-read, 4-write port register would not actually be replaced with two 12-read, 6-write register files; rather, it would be replaced with two 4-read, 4-write register files. The complexity measure of the two smaller register files would now be $2*(4+4)^2=128$. Compare this with a complexity rating of 328 or even 244 for the other solutions. Using two smaller register files will always minimize complexity while adding register ports. It is important to remember the smaller register files function like a single register file from the perspective of the programmer or compiler. Thus, multiple smaller register files do not address other issues such as the complexity associated with making more visible registers available to a user.

The bypass circuitry can be made hierarchical at the granularity of the replicated register files to reduce its complexity as well. However, in this case the complexity reduction comes with a potential performance penalty. If there are any dependencies between instructions running on different execution units the processor may stall waiting for a completion instead of being able to bypass values.

Generally, instructions are steered to an execution unit by the hardware based on the type of instruction it is (e.g., integer or floating point). The programmer or the compiler, given the view of a single uniform register file, has no control over the steering of instructions.

Figure 3:
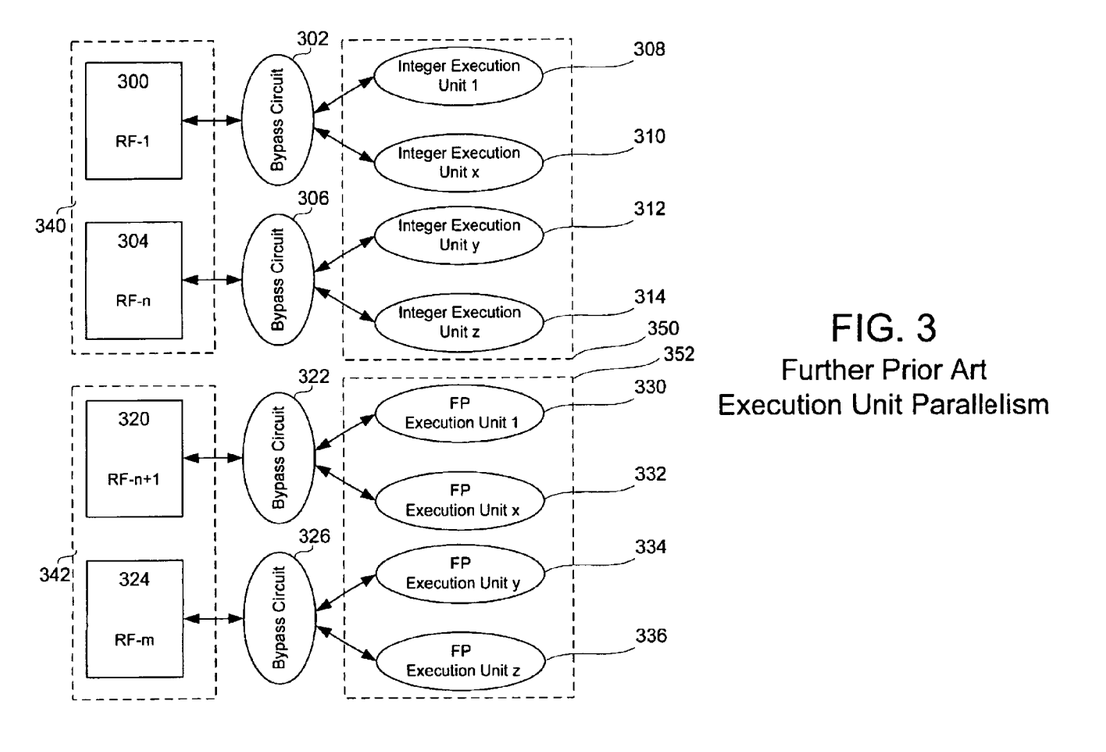
FIG. 3 is a block diagram showing another next stage of parallelism in a prior art processor.

Making maximum use of the above results, processors were designed with multiple register files coupled to multiple execution units. This architecture is shown in FIG. 3. A series of register files is implemented, divided into two groups. Group one is shown starting at Register File 300 and ending with Register File 304, group two is shown starting at Register File 320 and ending with Register File 324. A plurality of register files exist between Register Files 300 and 304, and between Register Files 320 and 324. Each of the two groups of register files is assigned to one type of execution unit.

Group one, having Register Files 300 and 304, are connected to integer execution units. Integer Execution Units 308 and 310 are shown connected to Register File 300. There will typically be more integer execution units implemented between Integer Execution Units 308 and 310, all connected to Register File 300. Bypass Circuit 302 handles contention and data integrity issues with multiple simultaneous access to the same location over the address space of Register File 300.

For each register file between and including Register Files 300 and 304, there will be a bypass circuit and a set of integer execution units, as explained in the paragraph above.

The second group of register files, shown as Register Files 320 and 324 and including further register files between them, are each connected to a number of floating point execution units.

Register File 320 is shown connected to Floating Point Execution Units 330 and 332. There may be further floating point execution points implemented between the two shown. Bypass Circuit 322 handles the contention and data integrity issues by detecting attempted simultaneous reads/writes to the same address in Register File 320, arbitrating all the floating point execution units to which Register File 320 is attached.

The functional unit just described containing Register File 320, Bypass Circuit 322, and at least Floating Point Execution Units 330 and 332, is duplicated a number of times. The last functional unit is shown as Register File 324, Bypass Circuit 326, and at least Floating Point Execution Units 334 and 336. There will ordinarily be more of these functional units between the first and last just described.

It must be emphasized that all the integer register files function like a single integer register file when viewed from outside the processor, and that all the floating point register files function like a single floating point register file when viewed from outside the processor. The visible external difference between processors implementing an architecture exemplified by FIG. 3 and an architecture as exemplified in FIG. 1 is better throughput; the architectural differences (multiple register files, multiple execution units) are not seen.

From FIG. 1, Instruction Fetch And Dispatch Unit 122 loads the same values in the same relative locations in all integer register files, Register Files 300 and 304 in FIG. 3. Instruction Fetch And Dispatch Unit 122 loads the same values in the same relative locations in all floating point register files, Register Files 320 and 324. The two register file groups are different because values for different instructions are sent to each group—all integer values to one and floating point to the other. The dotted-line boxes outline the execution units and register files that are copies of each other (the register files) or contain the same type of execution units. Dotted-line Box 340 enclose the integer register files while Dotted-line Box 342 the floating point register files. Similarly, all the execution units within Dotted-line Box 350 are integer execution units, and those in Dotted-line Box 352 are all floating point execution units. As viewed from outside the processor, Dotted-line Boxes 340 and 350 function like the single Register File 138 and single Execution Unit 126 from FIG. 1, and Dotted-line Boxes 342 and 352 function like the single Register File 136 and single Execution Unit 128 from FIG. 1.

Although this provides increased parallelism by allowing more execution units to operate in parallel at the instruction level, the addition of register files within Dotted-line Boxes 340 or 342 and the addition of execution units within Dotted-line Boxes 350 or 352 are invisible at the macro-architecture level. Anything not inherently parallel at the instruction level cannot make use of any additional execution units or register files.

The prior art methods used to increase throughput by increasing parallelism have reached a limit. The size of individual register files are at an upper bound due to the complexity discussed above as well as the problem of adding addressing bits within an instruction which would be required for larger register files; the number of execution units that can be connected to each register file is at an upper limit due to limits on throughput and connectivity complexity; and, the number of register file/execution unit combinations reaches an upper bound due to diminishing returns on adding parallelism that can only be exercised on a per instruction level.

Given the ever increasing demand to increase system throughput and therefore processor throughput, there is an urgent need to identify and make useful any additional parallelism that can be found within the processor, at the instruction level and process level. There is an additional need to make this increase in throughput available to both legacy software and new software.

It is therefore a goal of this invention is to provide a method and system for increasing processor throughput by increasing the parallelism available within a processor. It is a further goal of this invention to make the improved parallelism available to both legacy and new software.

BRIEF DESCRIPTION OF THE INVENTION

The present invention significantly increases parallelism in a processor by implementing a new architectural feature called a register domain. A register domain is a single logical register file and the execution units coupled to it, where the execution units may be of mixed types (integer and floating point). Each register domain's logical register file is an independent set of registers from all other logical register files. In a significant departure from prior art processors, register domains are visible to the user who may direct individual instructions or instruction streams to the register domain of the user's choice. The combination of the register domains and their direct controllability by users greatly increases parallelism within the processor as well as the parallelism available to the user as compared to traditional processors.

DETAILED DESCRIPTION OF PREFERRED EMBODIMENTS

Person of ordinary skill in the art will realize that the following description of the present invention is illustrative only and not in any way limiting. Other embodiments of the invention will readily suggest themselves to such skilled persons having the benefit of this disclosure.

When viewing the figures, it is intended that similar designations used in this disclosure are intended to designate substantially similar matter.

Figure 4:
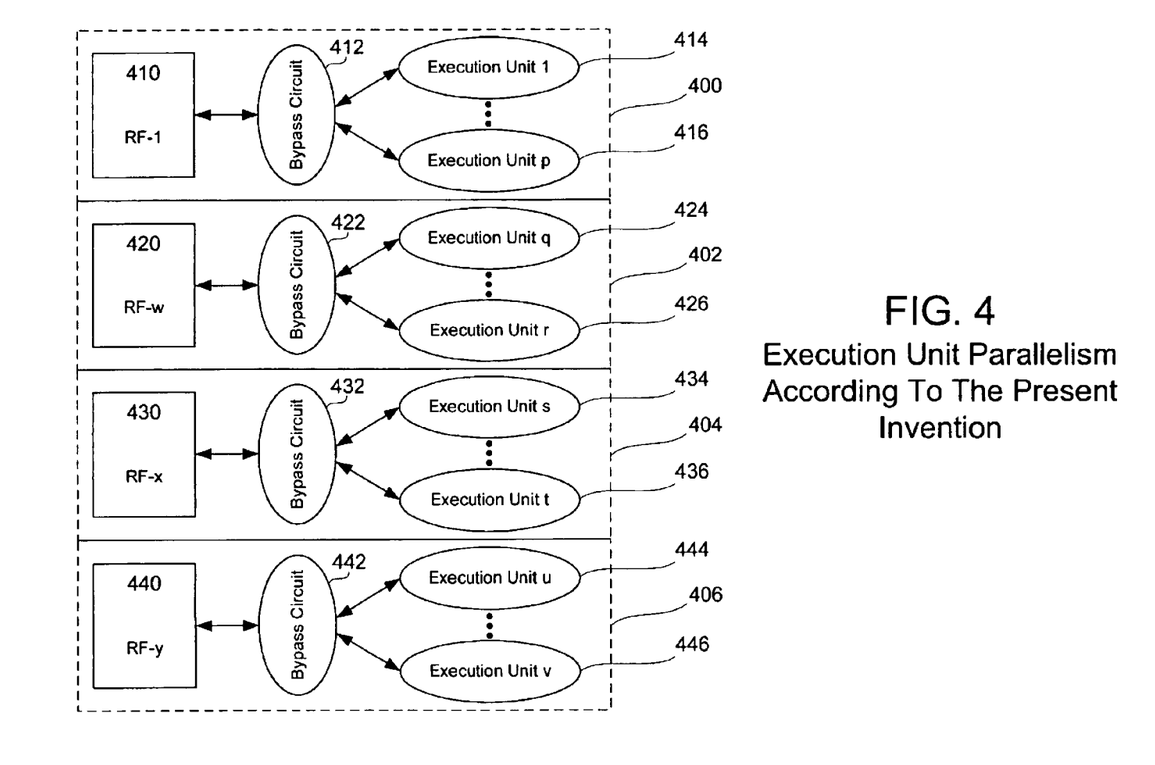
FIG. 4 is a block diagram showing parallelism in a processor according to the present invention.

Referring now to FIG. 4, execution unit parallelism is shown according to the present invention. The dotted-line boxes enclose Register Domains. A Register Domain has at least one register file, at least one execution unit, and coupling circuitry between the register file and execution unit. Shown in FIG. 4 is a typical implementation, explicitly showing Register Domains 400, 402, 404 and 406. As will be readily apparent to one of ordinary skill in the art having the benefit of the present disclosure, the number of Register Domains in any one processor implementation can and will vary based on factors such as cost and performance targets. FIG. 4 shows that the present invention fully contemplates a varying multiplicity of Register Domains by showing Register Domain 400 having Register File RF-1, and Register Domain 402 having Register File RF-w. There may be any number of Register Domains between Register Domains 400 and 402.

Looking further at Register Domain 400, Register File RF-1 may contain both integer and floating point values and is connected through Bypass Circuit 412 to at least two execution units. Shown are the first execution unit, Execution Unit 414, and the last execution unit, Execution Unit 416, connected to Bypass Circuit 412. The number of execution units implemented between Execution Unit 414 and Execution Unit 416 can and will vary in each processor implementation, depending on the such considerations as cost and performance needs. Execution Units 414 and 416 need not be of the same type. Thus, Execution Unit 414 may be a floating point execution unit while Execution Unit 416 may be an integer execution unit. In addition, they may be mixed in any ratios deemed appropriate for a particular processor instantiation. For example Register Domain 400 could have four integer execution units and two floating point execution units. Register Domains encompass the ability to mix execution units in whatever ratios are needed.

Each Register Domain is shown as having a single Register File. Each of Register Files RF-1, RF-w, RF-x, and RF-y in actuality represent a single logical Register File. A logical Register File may be physically implemented as more than one physical register file, using implementation techniques that will be readily apparent to a person of ordinary skill in the art and having the benefit of the present disclosure. For the purposes of this disclosure, it is to be understood that when referring to a Register File or a logical Register File in a Register Domain according to the present invention, any compatible physical implementation of the Register File, which may include one or more physical register files and accompanying circuitry, is included in the reference.

Continuing on in FIG. 4, Register Domains 402, 404 and 406 are similar to Register Domain 400. Each Register Domain has its own register file (Register Files RF-w, RF-x, and RF-y respectively) and bypass circuit (Bypass Circuits 422, 432, and 442 respectively). Each Register Domain is also shown with at least two execution units, illustrated as Execution Units 424/426, 434/436, and 444/446 respectively. Just as each Register Domain may have a mix of execution units within itself, different Register Domains may have different mixes of execution units when compared to other Register Domains in one processor. An example from FIG. 4 would be Register Domains 400 and 402 having four integer execution units and two floating point execution units each, Register Domain 404 having all integer execution units, and Register Domain 406 having all floating point units. Combinations other than those discussed above will readily come to mind to persons with ordinary skill in the art and having the benefit of the present disclosure.

Having fully described and disclosed Register Domains with mixes of execution units, it is worth noting that the majority of processors using the present invention are likely to have Register Domains containing the same type of execution units.

An important architectural feature of the present invention may now be introduced. Each Register Domain is visible at the macro-architectural level, that is, outside the processor. This is a significant departure from the prior art. Register domains also make significantly more unique registers visible to the user, as the number of visible registers is the number of register domains multiplied by the number of registers per domain. Methods for using Register Domains, as well as additional structure supporting Register Domains, are discussed below. With the structures and methods disclosed, including the explicit nature of Register Domains, it is possible to use the present invention to achieve better overall processor throughput while keeping complexity to a minimum by having fewer execution units attached to each register file, with fewer ports per register file, than was possible with the previous processor architectures. Register domains also reduce the complexity of implementing wide superscalar processors since the logic is broken down into smaller units. Smaller units can operate at higher clock frequencies and usually require less time to design and validate. The present invention thus provides advantages in macro-architecture as well as numerous improvements in speed at the micro-architectural level over prior processors.

Figure 5:
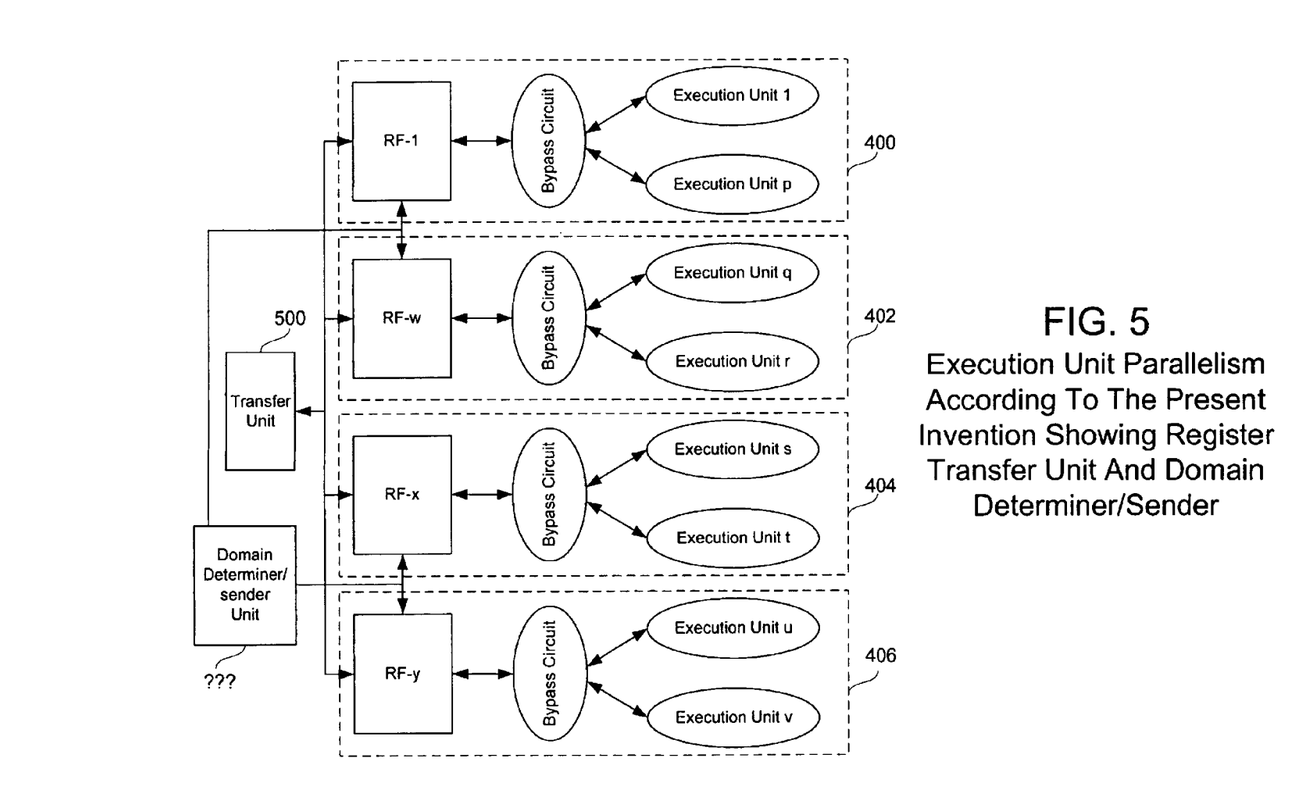
FIG. 5 is a block diagram showing parallelism in a processor according to the present invention also showing a register transfer unit.

Continuing now with FIG. 5, the dotted-line boxes surrounding each Register Domain are shown, referring to Register Domains 400, 402, 404, and 406. Each Register Domain has one logical Register File associated with it, coupled with the associated bypass circuitry and execution units. To avoid clutter in FIG. 5 which might obscure the points of discussion, the same components as just described in FIG. 4 are not called out but will readily apparent with visual inspection.

FIG. 5 shows two additional functional units over FIG. 4. One is needed to operatively connect the Register Domains to the rest of the processor, the other is present in order to provide desired functionality to support the capabilities of the present invention.

The first additional functional unit is a Domain Determiner/Sender Unit 510. The Domain Determiner/Sender (DD/S) Unit 510 takes the stream of instructions from the sequencer and steers each instruction to the appropriate register domain. The steering of the DD/S Unit is directly controlled by the user by encoding the steering information into the instruction stream. Steering information could be encoded in a number of different ways. One way is to have each instruction encode within itself what domain it is intended for. This may be called a self-steering instruction. Another is to add to the instruction stream extra instructions that specify the steering information for following instructions. These "steering instructions" convey information to the DD/S Unit. The later approach would be more desirable when extending an existing instruction set architecture. Default domain steering rules will be used when no explicit steering information is provided to the DD/S. Some instructions are not executed in any register domain, but execute in separate shared execution units. The DD/S will recognize these instructions and send them to the appropriate execution unit.

As is well known in the art sequences of instructions constitute one or more instruction stream or streams, where the instruction streams originate from a program or from more than one program. When used in this disclosure, the concept of a program using the Register Domains includes reference to the instruction stream corresponding to the program. In addition, when referring to a program using the present invention "program" includes all programs from any source, including user-originated and system-originated, privileged and non-privileged. When discussing a user-visible instructions contained in a user program, the intent is to include any and all instructions originating from any program, where "user" refers to any program using a processor encompassing the present invention. This covers the traditional "user" who is outside the operating system of a computer system having a processor with the present invention, but also includes any instruction originating from outside the processor, including instructions originating from an operating system or an application-layer program.

Continuing with FIG. 5, DD/S Unit 510 decodes steering instructions which indicate which Register Domain the instructions following in the instruction stream are to be sent, or decodes a steering instruction embedded within one instruction to be used only for itself. DD/S Unit 510 executes steering instructions for instruction streams or embedded (self-)steering instructions for a single instruction, by sending the right instructions to the right Register Domain or independent execution unit. This includes the use of default Register Domains if no specific Register Domain was specified.

It will be appreciated by persons of ordinary skill in the art and given the benefit of the present disclosure that DD/S unit 510 can be implemented in a number of ways. Readily discernable implementations include a wholly microcoded implementation which could run in Prefetch And Dispatch Unit 122, to a logic implementation embedded as separate circuitry in the processor chip, to some combination of circuitry and microcode. It is contemplated that the inventive features of the current invention encompass these and other implementations that will come to mind to those of ordinary skill in the art with the benefit of the present disclosure.

The second additional functional unit is Transfer Unit 500. Transfer Unit 500 connects each of the register files so that any specific register's contents may, if a program so directs, be written to another register in another Register Domain. This is selected on a register-by-register basis, so may involve anything from a single register copy to a multiple register move. The ability to move values between register domains is typically used by a single program to more easily partition computation across the register domains.

As with DD/S Unit 510, it will be appreciated by persons of ordinary skill in the art and given the benefit of the present disclosure that Transfer Unit 500 can be implemented in a number of ways. For cost-conscious implementations, Transfer Unit 500 may use traditional main memory as the transfer media, coupled with methods for its use and supporting machine instructions (register transfer instructions) with hardware enforced ordering. In this type of implementation logical DD/S Unit 510 primarily represents a method and will require a minimal amount of additional hardware support. Alternatively for a high-end processor where speed is more important than cost, Transfer Unit 500 may be implemented using dedicated local storage and dedicated read/write lines along with methods for its use and supporting machine instructions. It is contemplated that the inventive features of the current invention encompass these and other implementations that will come to mind to those of ordinary skill in the art having the benefit of the present disclosure.

A processor built according to the present invention can readily be implemented to use Register Domains to enable the processor to exploit different granularities of parallelism. The next paragraph describes an important feature of Register Domains, but it must be remembered that the present invention fully encompasses implementations both with or without this feature. This feature will add to the cost of implementation, so will be found on high end processors according the present invention rather than on cost conscious processors according to the present invention.

Figure 6:
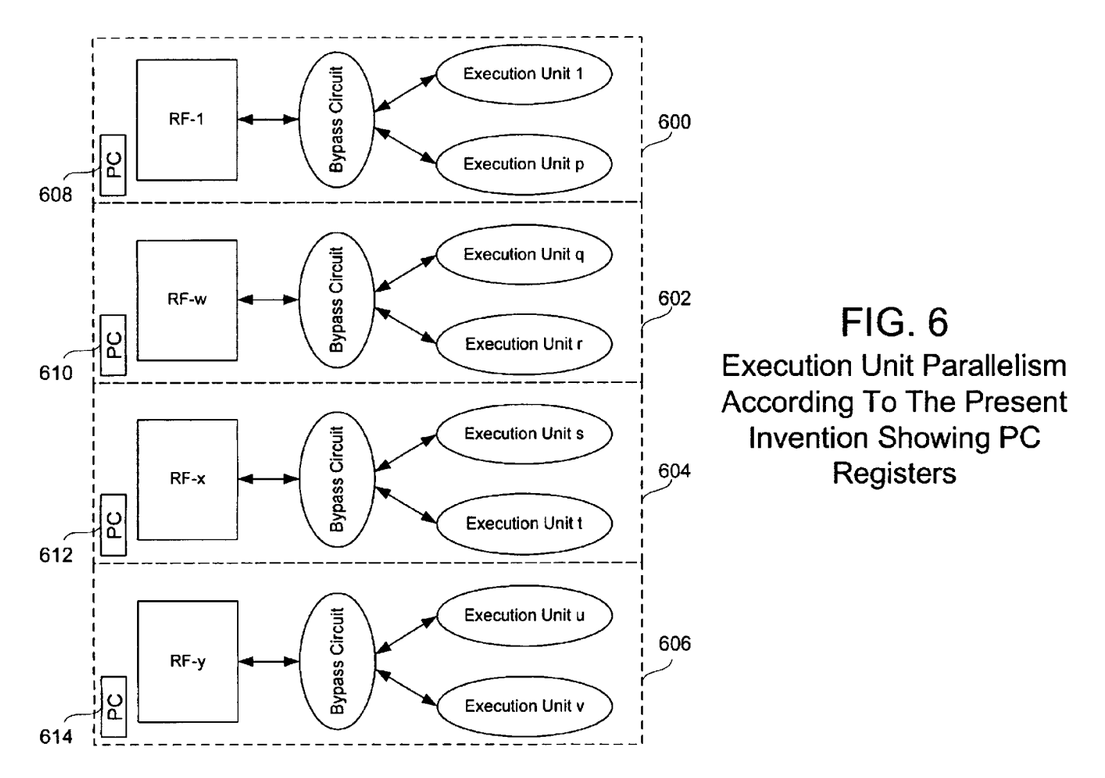
FIG. 6 is a block diagram showing parallelism in a processor according to the present invention with additional PC registers.

By replicating the program counter and its related program sequencer circuitry, together referred to as a Program Counter (PC), the processor can operate in a number of modes. The addition of multiple PCs is shown in FIG. 6. Register Domains 600, 602, 604, and 606 are shown, with program counters 608, 610, 612 and 614. PC 608 is connected to Register Domain 600, PC 610 is connected to Register Domain 602, PC 612 with Register Domain 604, and PC 614 with Register Domain 606. The processor can operate with a single system-wide PC and utilize all the register domains to achieve the maximum amount of instruction level parallelism, effectively not using local PCs 608, 610, 612 and 614. This would operative substantially similarly to implementations not including PCs 608 through 614 (not shown is the processor-wide PC which is conventional in the art). Alternatively, the processor can be used such that each Register Domain is an independent subprocessor with its own PC and a fixed set of execution units. Each of these subprocessors, 600, 602, 604, and 606 would function as an independent processor, allowing the parallel execution of multiple processes or threads. If the present invention is used in an implementation where an existing instruction set is extended, each of these subprocessors can be a fully compatible processor for legacy binaries.

Another operational and implementation mode that can be used is to group Register Domains such that a designated PC is driving a set of Register Domains, rather than one Register Domain. In FIG. 6, an example configuration would be operatively coupling PC 608 with both Register Domains 600 and 602, and PC 612 with Register Domains 604 and 606 (not using PCs 610 and 614), forming two subprocessors thereby. The enabled PC and its associated Register Domains would be treated like a single subprocessor from a program's perspective. An arbitrary number of PCs could be enabled at any time, each with a different number of register domains assigned to it. This partitioning of subprocessors, or Register Domains with PCs and accompanying circuitry, can be done dynamically and enables the processor to best match the hardware to the available parallelism of the software. User-visible instructions are used to associate a group of Register Domains to a PC, or specify a specific Register Domain with a PC, dynamically creating a subprocessor. Likewise, subprocessors can just as easily to broken down into individual Register Domains again and then regrouped as desired. These instructions may be called subprocessor instructions, and will include the ability to create and destroy subprocessors (group and disassociate Register Domains to PCs).

The ways in which Register Domains can be grouped and used as subprocessors will generally be specific to a process, characterized by at least its own address space and privilege level. As will be recognized by one of ordinary skill in this art and having the benefit of this disclosure, when context switching occurs the configuration of the processor, and therefore of any subprocessors, will change accordingly.

As stated earlier, in a significant departure over the prior art the present invention crosses the micro-architecture/ macro-architecture divide. Register Domains and user-created subprocessors are visible outside the processor and are expected to be explicitly used by programs. Register Domain and subprocessor use by programs can take many forms. The two most common usages will be by smart compilers and, where a particular need exists, directly by programmers.

Figure 7:
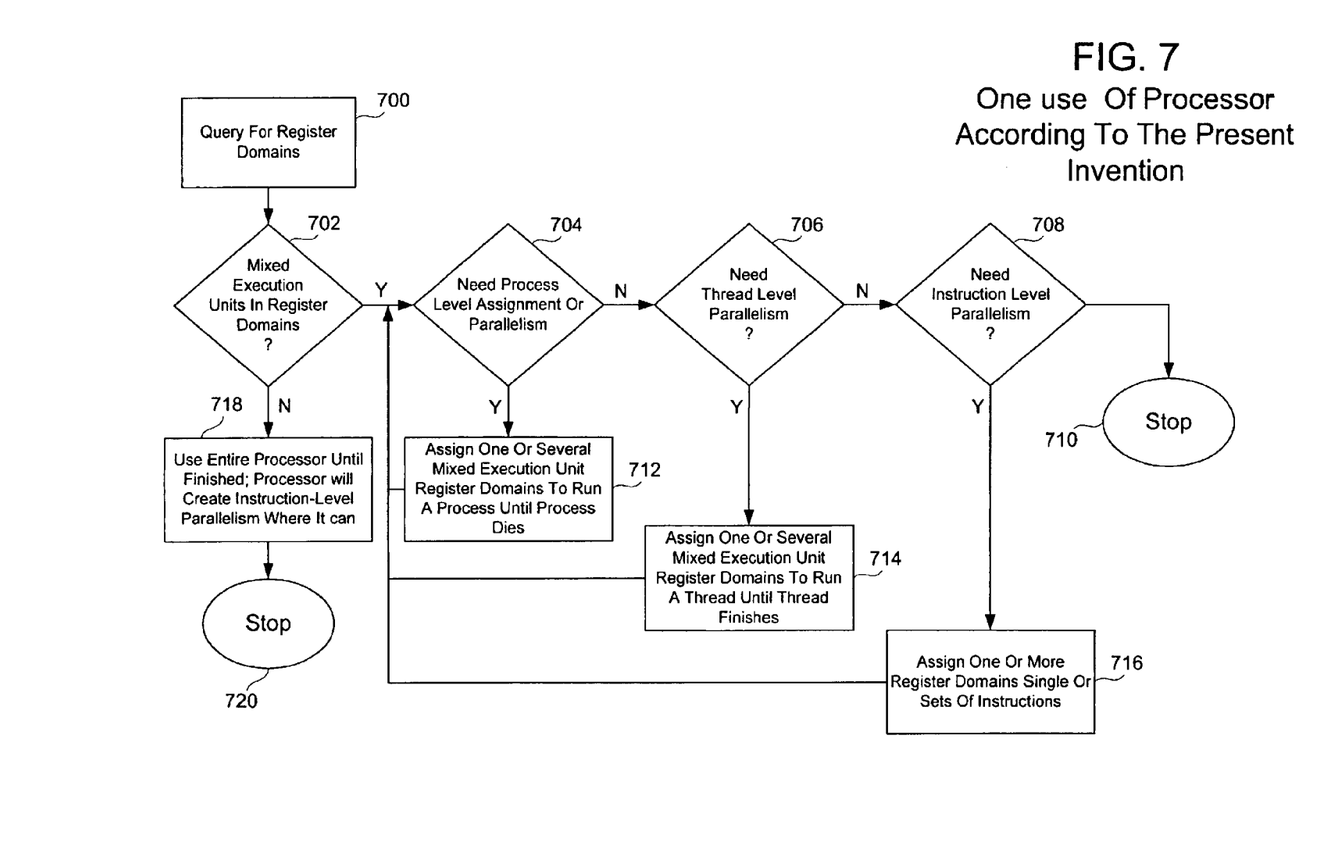
FIG. 7 is a flowchart illustrating one use of a processor in accordance with the present invention

The Register Domains will be made visible through the creation and implementation of a Register Domain data exchange between the user (or other process) and the processor of the present invention. A method of using Register Domains, including this initialization portion, is shown in FIG. 7. Components of the exchange may include an initial inquiry to the processor by a process. This step is expected to be an optional step in actual practice, because most or a significant number of programs will be compiled and run on the same hardware base and as such will "know" the Register Domain configuration. In cases where a process may query a processor, the processor will tell the process which type or configuration of processor it is and is shown as step 700 (FIG. 7). This could be accomplished by a number of means as are well known in art such as having predefined types, look up tables, or other data structures which tell the process how many and what type of Register Domains are available to it. It is fully contemplated that there may be different numbers and different types of Register Domains available to processes of different privilege levels.

The process will use the information it received to first determine what choices of parallelism are available. If the Register Domains in the processor all contain only one execution unit type, then parallelism will generally occur at the instruction level rather than the process or thread level. This is due to the contents of the instruction streams that generally issue from a process or a thread. In those cases, it will be expected that both floating point and integer execution units will be needed. Continuing on in FIG. 7, this is shown in diamond 702 where different paths are taken depending on the choice of Register Domains available, mixed (integer and floating point) or single type (integer or floating point).

On some occasions it will be known that a thread may only contain one type of instruction. In such cases the process making use of the Register Domains will assign the thread to a Register Domain having a single execution unit type.

If there are mixed execution units available in single Register Domains, then the user program makes a decision on what to do by following the decisions in diamonds 704, 706, and 708 until it reaches the first condition that matches. Diamond 704 determines if parallelism is needed at the process level, requiring mixed execution unit Register Domains, diamond 706 determines if a request for parallelism has been requested at the thread level, also requiring mixed execution unit Register Domains, and diamond 708 determines if instruction level parallelism is requested—in which case single execution unit Register Domains may be used. In each of diamonds 704, 706, and 708 if the answer is "Y" then their associated action blocks, 712, 714, and 716 respectively, are entered. Each action block assigns the correct type and number of Register Domain(s) and returns to diamond 704, ready to assign the next instruction or instruction stream.

This loop through 704, 706, and 708 and back to 704 continues until nothing is requested or specified. In that case the answer in diamonds 704, 706, and 708 is "N" and stop point 710 is entered. The only why no parallelism at all is wanted is when execution stops. This is because the default level of parallelism is at the instruction level, shown in diamond 708. If the default is not chosen, the program is ending.

Going back to diamond 702, if there are no mixed execution units in any Register Domains, then the default mode is used, shown in block 718 until the program ends in stop point 720. In block 718, the entire processor is used with the any added instruction level parallelism that may be identified by the processor itself.

One way of accomplishing the steering of instructions and instruction streams is using a type of steering instruction called a tag steering instruction. Each tag steering instruction contains a Register Domain indicator, showing which Register Domain to send all following instructions. The instructions following the tag steering instruction are sent to the specified Register Domain until the next tag steering instruction is received. The instructions following the next tag steering instruction are then sent to the Register Domain indicated. Sequences of instructions are thus directed to specific Register Domains, with switching occurring each time a tag steering instruction is received.

In addition to sending individual instructions or instruction streams to designated Register Domains, the process or program using the Register Domains can also make use of an explicit register transfer capability. This allows any particular register, or set of registers, in the register file of one Register Domain to be transferred (read and written) to specified register location(s) in another Register Domain's register file or to a third location (typically main memory). Instructions supporting this capability are called register value transfer instructions. This allows communication between processes, threads, or even groups of instructions. Those of ordinary skill in the art and with the benefit of the present disclosure will recognize many ways in which registers may be used for signaling between processes, instruction streams, threads, or perhaps groupings of instructions. It includes signaling with simple flag values, to exchanging values for mutually dependant calculations, to coordinating instruction flows or processing flows, to signaling the end of a sequence of instructions that should not be interrupted. All may be readily accomplished using explicit register value transfers between register files of different Register Domains.

Figure 8:
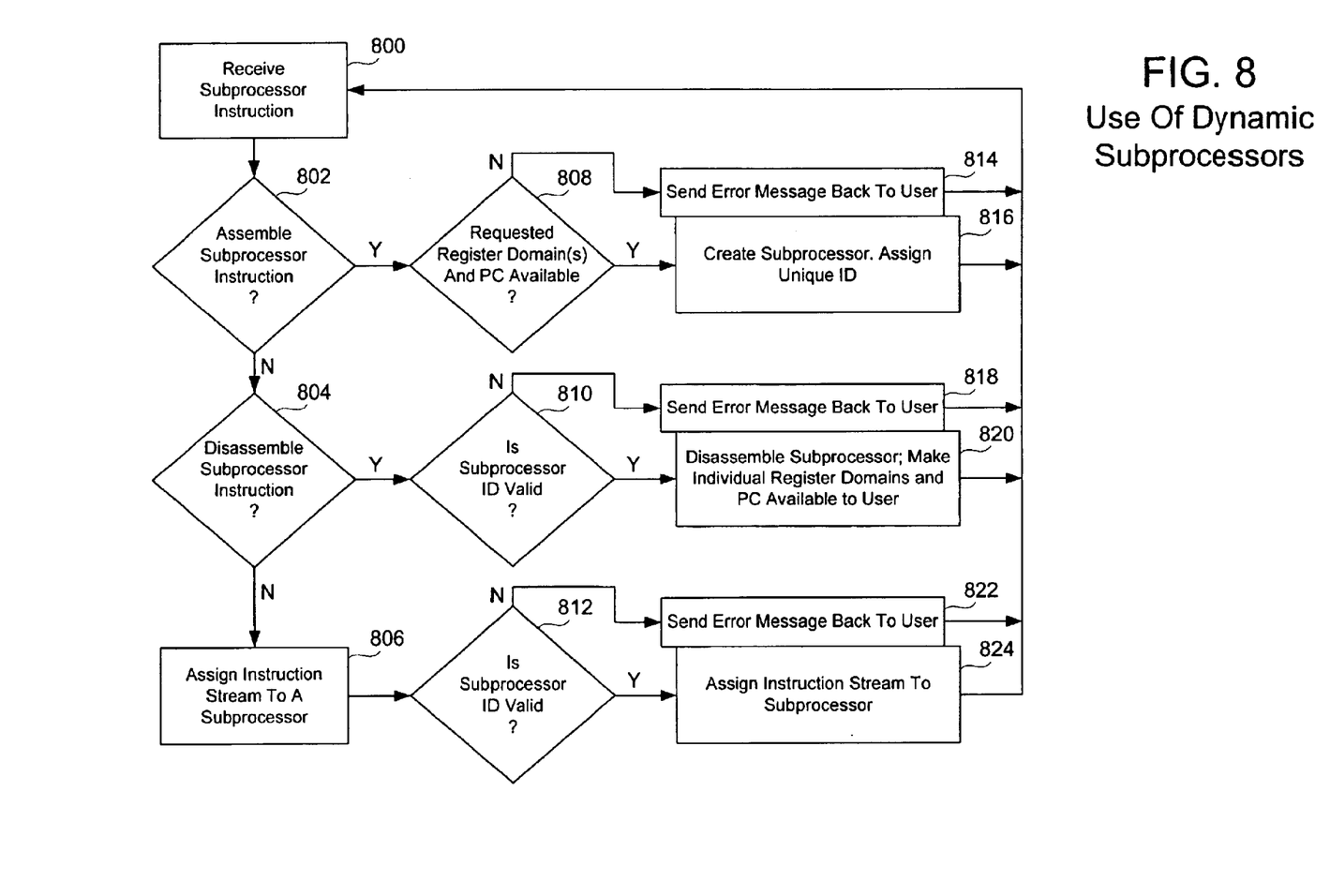
FIG. 8 is a flowchart illustrating another use of the processor in accordance with the present invention.

Referring now to FIG. 8, a method for using dynamic subprocessors according to the present invention is shown. When an instruction dealing with subprocessors is received by the processor, it is sent to block 800 which receives it to initiate the method. If there are no subprocess instructions outstanding, block 800 is in a "wait" state and waits until such an instruction is sent to it.

Diamond 802 checks the instruction to see if it is a request to assemble a new subprocessor. If it is, the "Y" exit from 802 is used and diamond 808 is entered. Diamond 808 determines if the resources requested are available. If they are, the "Y" exit from 808 is taken and block 816 entered. The actions taken in block 816 include associating the requested Register Domains with a PC, and assigning a key or unique ID to the new subprocessor so it can be referenced by the user. The unique ID is sent back to the user and block 800 entered, ready to process the next available subprocess instruction.

If, at diamond 808, the requested resources where not available an error message so stating is sent to the user. Proceeding to block 800, another subprocess instruction is acted on if available.

If, at diamond 802, the subprocess instruction was not a request to assemble a subprocessor the "N" exit is taken leading to diamond 804. Diamond 804 determines if the subprocessor instruction is a request to disassemble an existing subprocessor, since the explicit instructions a user If it is, the "Y" exit is taken to diamond 810. Diamond 810 checks the validity of the subprocessor ID. If the subprocessor ID is valid the "Y" exit is taken, entering block 820. Within block 820 the components that made up the subprocessor associated with the valid ID are made available as individual Register Domains, and any associated resources released (such as the PC). The previously valid ID is made invalid. After the actions in block 820 are completed, block 800 is entered, ready to process the next available subprocess instruction.

If, in diamond 810, it is determined that the supplied subprocessor ID is not valid then "N" exit is used and block 818 entered. Within block 818 an appropriate error message is created and sent to the user, stating the user supplied an invalid subprocessor ID. After the actions in block 818 are completed block 800 is entered, ready to process the next available subprocess instruction.

If, at diamond 804 it is determined that the subprocessor instruction was not a request to disassemble an already existing subprocessor, it must be that the instruction is a request to associate an instruction stream to an existing subprocessor. This is so because there are basically three types of subprocessor instructions—create, disassemble, and associate or assign an instruction stream to an existing subprocessor. The "N" exit from 804 is used, leading to block 806 which extracts the ID in the instruction. Diamond 812 is then entered, where it is determined if the supplied ID is valid. If it is a valid subprocessor ID, the "Y" exit is used and block 824 entered. There, an instruction stream is associated with, or assigned to, the designated subprocessor. After that is completed, the process proceeds to block 800, ready to process the next available subprocess instruction.

If, at diamond 812 it was determined that the ID supplied by the user is invalid, the "N" exit is taken, leading to block 822. An error message stating that an invalid ID was sent is issued to the user, after which the process proceeds to block 800, ready to process the next available subprocess instruction.

The present invention has just been partially described through the use of flow charts. As is appreciated by those of ordinary skill in the art and with the benefit of the present disclosure, the procedures described herein may be repeated as continuously or as often as necessary to satisfy the needs described, and details or order of steps may vary without departing from the basic concepts disclosed herein.

An additional feature of the Register Domains is that they are completely compatible with legacy (existing) software. For user applications that are not Register Domain aware, the operating system will decide how to use the available Register Domains to maximize parallelism. Methods used to do this will be dependant on factors such as process priority and system load, but no changes will need to be made to the existing application software base. The worst case, in terms of backward compatibility, would be using a Register Domain processor with an older operating system that is not Register Domain aware together with applications which are not Register Domain aware. In that case the processor will send instruction streams to default Register Domains, allowing the older software to run as if it were on a non-Register Domain processor. The potential speed of the Register Domain processor will not be fully realized, but there will not be any issue of successfully executing any and all instructions sent by the older software to the new processor.

In using the Register Domains, a program may query the processor, request a transfer of values between register files of different Register Domains, request subprocessors be created, subprocessors be disassembled, assign instruction streams to subprocessors, and indicate which Register Domain a process, subprocess, forked process, thread, or specified sequence of instructions is to be sent. This is accomplished using the appropriate Register Domain instructions in a program. The information needed to fully accomplish the intended actions will be stored on machine readable media in data structures, and then communicated to the processor using an extended instruction set.

In the case of the UltraSPARC processor, the standard SPARC instruction set, SPARC-V9, is documented in The SPARC Architecture Manual, Version 9 and is available from Sun Microsystems. An implementation of the present invention on an UltraSPARC processor would include an implementation of the hardware as previously described in the present disclosure, and an extended instruction set complimentary to the standard instruction set. The extended instructions allows the Register Domain requests made by a program to be communicated to the processor.

Figure 9A:
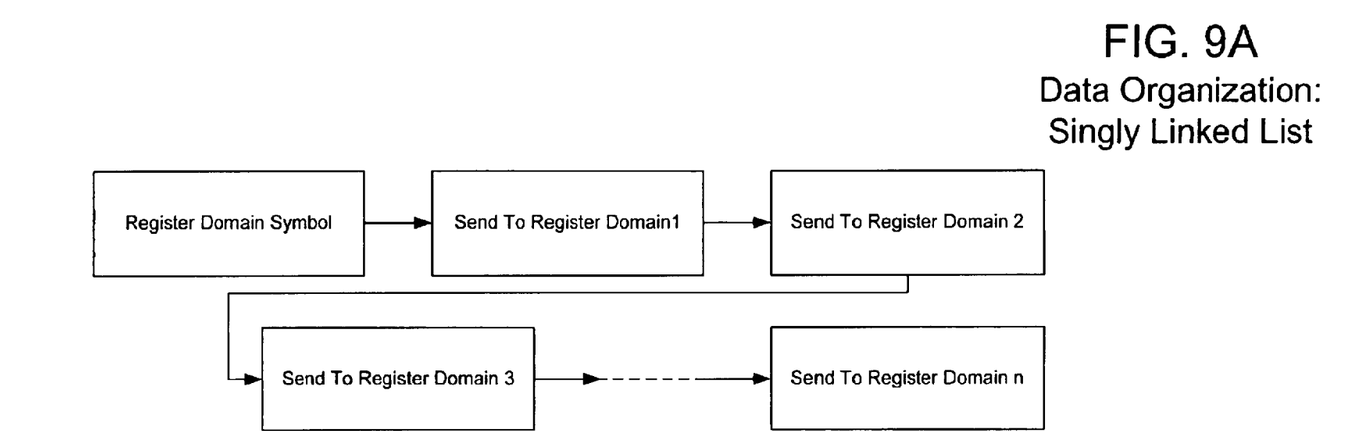
FIG. 9a is a diagram of a data structure that may be used with the present invention.
Figure 9B:
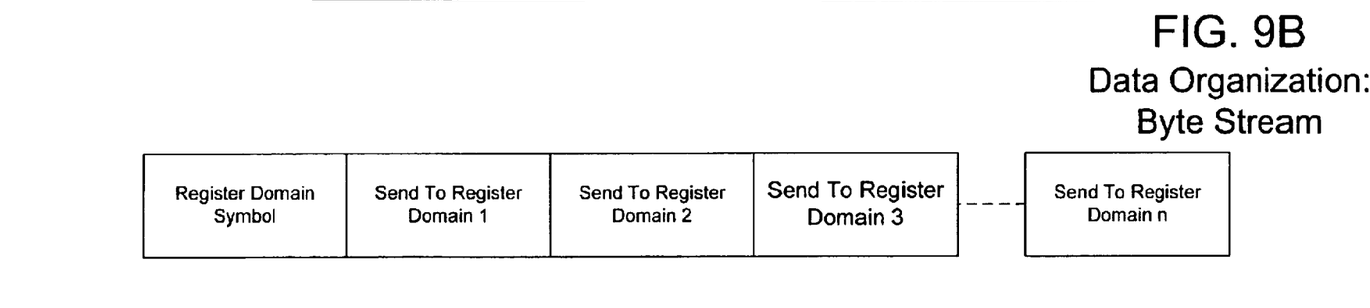
FIG. 9b is a diagram of a data structure that also may be used with the present invention.

FIG. 9a shows one possible data structure for requesting sets of instructions to be sent to specified Register Domains. There are a set of fields of pre-defined type and length plus a header field, organized as a singly linked list. In this case, the number of instructions following the data structure to send to Register Domain 1 is contained in the first linked field, the number of instructions to send to Register Domain 2 is contained in the second linked field, and so on until the number of instructions to send to Register Domain n is in linked field n. Another data structure implementation is shown in FIG. 9b, where the linked list with explicit pointers is replaced by a set of fields of specified length, such as two bytes, where every n-th field contains the number of following instructions to send to Register Domain n, and where the entire set of fields is contained in one or two words (e.g., 64 bits which is either two 32-bit words or one 64-bit word). A functionally similar data structure may be used for specifying uses of subprocessors as well.

As will be readily apparent to a person of ordinary skill in the art and having the benefit of this disclosure, there will be a large number of possible ways of representing the data that will be communicated between the processor and the process making use of the Register Domains. All such implementations are contemplated by the present invention, and may be used while staying within the spirit of the disclosure.

The present invention relates to processor architecture at both the micro and macro levels, and further relates to an extended instruction set providing explicit (macro level) use of the inventive aspects of the processor architecture. The present invention also encompasses machine readable media on which are stored embodiments (data structures) of the information to be communicated between the processor and a process using the Register Domains. It is contemplated that any media suitable for retrieving instructions is within the scope of the present invention. Examples would include magnetic, optical, or semiconductor media.

While embodiments and applications of this invention have been shown and described, it would be apparent to those skilled in the art that many more modifications than mentioned above are possible without departing from the inventive concepts contained herein. The invention, therefore, is not to be restricted except in the spirit of the associated claims.

What is claimed is:

1. A processor comprising:
   at least two register files including a first register file and a second register file;
   at least two execution units including a first execution unit and a second execution unit;
   a first register domain comprising at least said first register file operatively connected to said first execution unit;
   a second register domain comprising at least said second register file operatively connected to said second execution unit;
   at least one user-visible instruction comprising a first user-visible instruction capable of associating at least one instruction with at least one register domain, where said at least one instruction is not said first user-visible instruction; and
   a domain determiner operatively coupled to at least said first register domain and said second register domain and which may send instructions to register domains, and where said domain determiner is operationally and responsively coupled to said first user-visible instruction.

2. The processor of claim 1 further comprising,
   a transfer unit where said transfer unit is operatively coupled to said at least two register files; and
   where said transfer unit can transfer at least one register value to and from any register location in any of said at least two register files, and further comprising a second user-visible instruction which specifies at least one of a source and a target register in any register location in said at least two register files, where said transfer unit is operationally and responsively coupled to said second user-visible instruction.

3. The processor of claim 2 further comprising,
   a first plurality of user-visible instructions, a second plurality of user-visible instructions, and a third plurality of user-visible instructions and where said first plurality of user-visible instructions are steering instructions, said second plurality of instructions are register transfer instructions, and said third plurality of instructions are subprocess or instructions.

4. The processor of claim 2 further comprising at least one program counter where said program counter is configured so as to allow it to be dynamically and changeably operably coupled to at least one register domain.

5. The processor of claim 2 where said at least two execution units further comprise a first plurality of execution units and a second plurality of execution units, and where said first plurality of execution units are operatively coupled to said first register file and further comprise all integer execution units, and where said second plurality of execution units are operatively coupled to said second register file and further comprise all floating point execution units.

6. The processor of claim 5 where said at least two register files further comprise a first plurality of register files and a second plurality of register files and where each register file in said first plurality of register files is operably connected to at least one integer execution unit and where each register file in said second plurality of stores is operably connected to at least one floating point execution unit.

7. The processor of claim 6 further comprising a plurality of program counters where each of said plurality of program counters is configured to allow dynamic and changeable operable connections to a subset of said first and second plurality of register files and their operably connected execution units.

8. The processor of claim 2 where said at least two execution units further comprise a first plurality of execution units and a second plurality of execution units, and where said first plurality of execution units are operatively coupled to said first register file and further comprise at least one integer execution unit and at least one floating point execution unit, and where said second plurality of execution units are operatively coupled to said second register file and further comprise at least one floating point execution units and at least one integer execution unit.

9. The processor of claim 8 where said at least two register files further comprise a first plurality of register files and a second plurality of register files and where each register file in said first plurality of register files is operably connected to at least one integer execution unit and at least one floating point execution unit, and where each register file in said second plurality of register files is operably connected to at least one integer execution unit and at least one floating point execution unit.

10. The processor of claim 9 further comprising a plurality of program counters where each of said plurality of program counters is configured to allow dynamic and changeable operable connections to a subset of said first and second plurality of register files and their operably connected execution units.

11. The processor of claim 2 where said at least two execution units further comprise a first plurality of execution units and a second plurality of execution units, and where said first plurality of execution units are operatively coupled to said first register file and further comprise either at least one integer execution unit or at least one floating point execution unit such that the total number of execution units is at least one, and where said second plurality of execution units are operatively coupled to said second register file and further comprise either at least one integer execution unit or at least one floating point execution unit such that the total number of execution units is at least one.

12. The processor of claim 11 where said at least two register files further comprise a plurality of register files where each register file is operably connected to either at least one integer execution unit or at least one floating point execution unit such that the total number of execution units is at least one.

13. The processor of claim 12 further comprising a plurality of program counters where each of said plurality of program counters is configured to allow dynamic and changeable operable connections to a subset of said first and second plurality of register files and their operably connected execution units.

14. A processor comprising:
at least two register files including a first register file and a second register file;
at least two execution units including a first execution unit and a second execution unit;
a first register domain comprising at least said first register file operatively connected to said first execution unit; a second register domain comprising at least said second register file operatively connected to said second execution unit, and further where said second execution unit is of the same type as said first execution unit;
at least one user-visible instruction comprising a first user-visible instruction capable of associating at least one instruction with at least one register domain, where said at least one instruction may be itself; and,
a domain determiner operatively coupled to at least said first register domain and said second register domain and which may send instructions to register domains, and where said domain determiner is operationally and responsively coupled to said first user-visible instruction.

15. The processor of claim 14 further comprising a transfer unit where said transfer unit is operatively coupled to each of said at least two register files, and where said transfer unit can transfer at least one register value to and from any register location in any of said at least two register files, and further comprising a second user-visible instruction which specifies at least one of a source and a target register in any register location in said at least two register files, where said transfer unit is operationally and responsively coupled to said second user-visible instruction.

16. The processor of claim 15 further comprising a first plurality of user-visible instructions, a second plurality of user-visible instructions, and a third plurality of user-visible instructions and where said first plurality of user-visible instructions are steering instructions, said second plurality of instructions are register transfer instructions, and said third plurality of instructions are subprocessor instructions.

17. The processor of claim 15 further comprising at least one program counter where said at least one program counter is configured so as to allow it to be dynamically and changeably operably coupled to at least one register domain.

18. The processor of claim 15 where said at least two execution units further comprise a first plurality of execution units and a second plurality or execution units, and where said first plurality of execution units are operatively coupled to said first register file and further comprise all integer execution units, and where said second plurality of execution units are operatively coupled to said second register file and further comprise all floating point execution units.

19. The processor of claim 18 where said at least two register files further comprise a first plurality of register files and a second plurality of register files, where each register file in said first plurality of register files is operably connected to at least one integer execution unit and where each register file in said second plurality of stores is operably connected to at least one floating point execution unit.

20. The processor of claim 19 further comprising a plurality of program counters where each of said plurality of program counters is configured to allow dynamic and changeable operable connections to a subset of said first and second plurality of register files and their operably connected execution units.

21. The processor of claim 15 where said at least two execution units further comprise a first plurality of execution units and a second plurality of execution units, where said first plurality of execution units are operatively coupled to said first register file and further comprise at least one integer execution unit and at least one floating point execution unit, and where said second plurality of execution are operatively coupled to said second register file and further comprise at least one floating point execution unit and at least one integer execution unit.

22. The processor of claim 21 where said at least two register files further comprise a first plurality of register files and a second plurality of register files and where each register file in said first plurality of register files is operably connected to at least one integer execution unit and at least one floating point execution unit, and where each register file in said second plurality of stores is operably connected to at least one integer execution unit and at least one floating point execution unit.

23. The processor of claim 22 further comprising a plurality of program counters where each of said plurality of program counters is configured to allow dynamic and changeable operable connections to a subset of said first and second plurality of register files and their operably connected execution units.

24. The processor of claim 15 where said at least two execution units further comprise a first plurality of execution units and a second plurality of execution units, where said first plurality of execution units are operatively coupled to said first register file and further comprise either at least one integer execution unit or at least one floating point execution unit such that the total number of execution units is at least one, and where said second plurality of execution units are operatively coupled to said second register file and further comprise either at least one integer execution unit or at least one floating point execution unit such that the total number of execution units is at least one.

25. The processor of claim 24 where said at least two register files further comprise a plurality of register files where each register file is operably connected to either at least one integer execution unit or at least one floating point execution unit such that the total number of execution units is at least one.

26. The processor of claim 25 further comprising a plurality of program counters where each of said plurality of program counters is configured to allow dynamic and changeable operable connections to a subset of said first and second plurality of register files and their operably connected execution units.

27. A method for determining which register domain is to receive a sequence of one or more instructions comprising:

(a) viewing a sequence of instructions;

(b) detecting a steering instruction in said sequence of instructions;

(c) decoding said steering instruction;

(d) associating said steering instruction with a register domain if said steering instruction is a self-steering instruction;

(e) associating groups of instructions which are to follow said steering instruction with register domains as specified in said decoded steering instruction, if said steering instruction is not a self-steering instruction;

(f) sending said self-steering instruction to its associated register domain if said steering instruction was a self-steering instruction;

(h) sending groups of instructions to their associated register domains if said steering instruction was not a self-steering instruction;

(i) detecting a next steering instruction and proceeding to step (c); and, (j) finishing when there are no further instructions.

28. A method for transferring values in and out of register domains comprising:

(a) detecting a register value transfer instruction in a sequence of instructions;

(b) decoding said register value transfer instruction;

(c) transferring at least one value from a register file in a register domain from and to locations specified in said register value instruction if said register value instruction is a transfer instruction;

(d) receiving at least one value into a register file in a register domain from and to locations specified in said register value instruction if said register value instruction is a receive instruction; and, (e) transferring and receiving at least one value from a first register file in a first register domain to a second register file in a second register domain at locations specified in said register value instruction if said register value instruction is a transfer and receive instruction.

29. A method for controlling subprocessors comprising:

(a) detecting a subprocessor instruction in a sequence of instructions;

(b) decoding said subprocessor instruction;

(c) creating at least one subprocessor in accord with said subprocessor instruction if resources requested in said subprocessor instruction are available and said subprocessor instruction is a create subprocessor instruction;

(d) disassembling at least one subprocessor in accord with said subprocessor instruction if a requested subprocess or exists and said subprocessor instruction is a disassemble subprocess or instruction;

(e) associating an instruction stream to a subprocessor in accord with said subprocessor instruction if a requested subprocessor exists and said subprocessor instruction is a subprocessor association instruction; and (f) sending an applicable message to the issuer of said subprocessor instruction, if there is an applicable user message.

* * * * *